United States Patent
Zhai et al.

(10) Patent No.: US 10,952,281 B2
(45) Date of Patent: Mar. 16, 2021

(54) AUXILIARY TERMINAL-CONTROL APPARATUS AND METHOD

(71) Applicant: HUAWEI TECHNOLOGIES CO., LTD., Shenzhen (CN)

(72) Inventors: Haipeng Zhai, Xi'an (CN); Guanghai Wang, Riyadh (SA); Chongxiao Ma, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/493,221

(22) PCT Filed: Jun. 30, 2017

(86) PCT No.: PCT/CN2017/091177
§ 371 (c)(1),
(2) Date: Sep. 11, 2019

(87) PCT Pub. No.: WO2018/166110
PCT Pub. Date: Sep. 20, 2018

(65) Prior Publication Data
US 2020/0021678 A1    Jan. 16, 2020

(30) Foreign Application Priority Data
Mar. 14, 2017    (CN) .......................... 201710149965.0

(51) Int. Cl.
*H04W 92/18*    (2009.01)
*H04M 1/725*    (2006.01)
(Continued)

(52) U.S. Cl.
CPC .......... *H04W 92/18* (2013.01); *G06F 3/0362* (2013.01); *H04M 1/72527* (2013.01);
(Continued)

(58) Field of Classification Search
CPC ........... H04W 4/00; H04W 4/30; H04W 4/70; H04W 4/80; H04W 76/14;
(Continued)

(56) References Cited

U.S. PATENT DOCUMENTS 7,081,905 B1 * 7/2006 Raghunath .............. G06F 1/163
345/684
2003/0109290 A1    6/2003 Moffi et al.
(Continued)

FOREIGN PATENT DOCUMENTS

| CN | 103595874 A | 2/2014 |
| CN | 103856798 A | 6/2014 |

(Continued)

*Primary Examiner* — San Htun
(74) *Attorney, Agent, or Firm* — Stein IP, LLC

(57) ABSTRACT

An auxiliary terminal-control apparatus, where the apparatus includes a back plate sticker, a control key embedded into the back plate sticker, a communications module, and a control module. The control module is configured to recognize a target operation on the control key, and generate, based on the target operation, a corresponding target operation instruction, where the control key includes a roll ball and/or a key, operations on the roll ball include a roll operation and a press operation, and an operation on the key includes a press operation; and the communications module is configured to establish a communication connection to a terminal device to send the target operation instruction to the terminal device, where the target operation instruction is used to operate an application program on the terminal device or trigger a service.

19 Claims, 5 Drawing Sheets

(51) Int. Cl.
*H04W 4/48* (2018.01)
*G06F 3/0362* (2013.01)
*H04W 92/08* (2009.01)

(52) U.S. Cl.
CPC ......... *H04M 1/72583* (2013.01); *H04W 4/48* (2018.02); *H04W 92/08* (2013.01); *H04M 2250/52* (2013.01)

(58) Field of Classification Search
CPC ........... H04W 88/02–06; H04W 92/00; H04W 92/08; H04W 92/18; H04M 1/0252; H04M 1/0254; H04M 1/0256; H04M 1/026–0285; H04M 1/72527; H04M 1/72583; H04M 2250/52; G06F 3/0362
See application file for complete search history.

(56) References Cited

U.S. PATENT DOCUMENTS

| | | | | |
|---|---|---|---|---|
| 2008/0024957 | A1* | 1/2008 | Lee | G06F 1/169 361/600 |
| 2013/0147265 | A1 | 6/2013 | Belkhoudja et al. | |
| 2014/0155031 | A1* | 6/2014 | Lee | H04W 12/08 455/411 |
| 2015/0124566 | A1* | 5/2015 | Lake | G04G 21/08 368/10 |
| 2015/0160693 | A1* | 6/2015 | Stotler | G06F 1/1692 345/173 |
| 2016/0026156 | A1* | 1/2016 | Jackson | G04R 60/00 368/14 |
| 2016/0028869 | A1* | 1/2016 | Bhatt | H04M 1/7253 455/41.2 |

FOREIGN PATENT DOCUMENTS

| | | |
|---|---|---|
| CN | 103957311 A | 7/2014 |
| CN | 104618618 A | 5/2015 |
| CN | 104901723 A | 9/2015 |
| CN | 105353870 A | 2/2016 |
| CN | 105468152 A | 4/2016 |
| CN | 105635443 A | 6/2016 |
| CN | 105892318 A | 8/2016 |
| DE | 19728174 C1 | 8/1998 |
| DE | 19907799 A1 | 9/2000 |
| EP | 2602156 A1 | 6/2013 |
| KR | 20140048523 A | 4/2014 |

* cited by examiner

AUXILIARY TERMINAL-CONTROL APPARATUS AND METHOD

CROSS-REFERENCE TO RELATED APPLICATIONS

This application is a National Stage of International Application No. PCT/CN2017/091177, filed on Jun. 30, 2017, which claims priority to Chinese Patent Application No. 201710149965.0, filed on Mar. 14, 2017. Both of the aforementioned applications are hereby incorporated by reference in their entireties.

TECHNICAL FIELD

Aspects of this application relate to the field of communication control, and in particular, to an auxiliary terminal-control apparatus and method.

BACKGROUND

As mobile phones are used in increasingly extensive scenarios, convenience of use of mobile phones in specific scenarios needs to be considered.

A typical scenario is use of a mobile phone by a driver during driving. Currently, drivers are used to such driving habits as holding a steering wheel with one hand and operating a mobile phone with the other hand, and some drivers even operate their mobile phones with both hands off the steering wheel. This causes much inconvenience for operating a mobile phone in a driving scenario, and also brings huge safety risks.

SUMMARY

Embodiments of this application provide an auxiliary terminal-control apparatus and method, so as to improve convenience of use of a terminal device.

A first aspect of the embodiments of this application provides an auxiliary terminal-control apparatus, where the auxiliary terminal-control apparatus includes a back plate sticker, a control key embedded into the back plate sticker, a communications module, and a control module. The control module is configured to recognize a target operation on the control key, and generate, based on the target operation, a corresponding target operation instruction, where the control key includes a roll ball and/or a key, operations on the roll ball include a roll operation and a press operation, and an operation on the key includes a press operation; and the communications module is configured to establish a communication connection to a terminal device to send the target operation instruction to the terminal device, where the target operation instruction is used to operate an application program on the terminal device or trigger a service.

In this embodiment of this application, the auxiliary terminal-control apparatus serves as a peripheral of the terminal device with communication established to the terminal device, and can operate an application program on the terminal device or trigger a service by using the roll ball and/or the key. Therefore, in scenarios with inconvenience of using a terminal device, application programs or services on the terminal device can be used conveniently by using the auxiliary terminal-control apparatus.

Optionally, the auxiliary terminal-control apparatus further includes a storage module, where the storage module is configured to store configuration information, and the configuration information includes a correspondence between an operation on the control key and an operation instruction generated by the control module, that is, related information about what operation instruction is generated for each user operation on the control key. The control module is specifically configured to determine, based on the recognized target operation, the target operation instruction from the configuration information. Then the communications module sends the target operation instruction to the terminal device, thereby controlling the application program or the service on the terminal device.

It can be understood that the configuration information may be preconfigured, or defined on the terminal device by a user. In the case of being user-defined on the terminal device, it is the communications module that receives the configuration information sent by the terminal device and stores the configuration information into the storage module.

In this embodiment of this application, the user may define, on the terminal device, an operation instruction corresponding to each specific operation on the control key. Therefore, operation instructions can be user-defined based on different requirements and different scenarios to fit the various scenarios and requirements.

Optionally, if the control key includes a roll ball, the configuration information may be one or more of the following.

A slide operation instruction is generated for a touchscreen of the terminal device based on a roll operation on the roll ball. In this way, in this embodiment of this application, slides on the screen of the terminal device can be implemented by using the roll ball on the auxiliary terminal-control apparatus, so that the user can select an area of operation.

A selection operation instruction is generated based on a press operation on the roll ball, so as to select a location at which the roll operation currently stops. Therefore, a user can perform any tap operation on the terminal device through a roll operation and a press operation on the roll ball.

A trigger instruction is generated for a first target function of a first target application program on the terminal device based on a press operation on the roll ball, where the first target function of the first target application program includes functions such as answering a phone call, making a phone call, or an order-seizure function of a ride-hailing application.

A tuning operation instruction is generated for a volume key of the terminal device based on a roll operation on the roll ball.

Optionally, if the control key includes a key, the configuration information further includes one or more of the following.

A press-down operation instruction is generated based on a press operation on the key, so as to press down at a location at which the roll operation currently stops. Therefore, a user can perform any tap operation on the terminal device through a roll operation on the roll ball and a press operation on the key.

A trigger instruction is generated for a second target function of a second target application program on the terminal device based on a press operation on the key, where the second target function of the second target application program includes answering a phone call, making a phone call, an order-seizure function of a ride-hailing application, or the like.

A return operation instruction is generated based on a press operation on the key, where a return operation may be returning to a previous step or returning to a home screen of the terminal device.

Further, optionally, the terminal device may be a mobile phone and may be applied without being limited to any one of the following application scenarios.

In an application scenario, the auxiliary terminal-control apparatus is stick-fitted onto a steering wheel of a vehicle, enabling a driver to operate the mobile phone with no hand off the steering wheel, and implementing functions such as "one-keystroke order seizure", answering a phone call, making a phone call, or playing music.

In another application scenario, the auxiliary terminal-control apparatus is snap-fitted onto a back case of the mobile phone, so as to assist in operating the mobile phone in scenarios such as gaming and video.

In another application scenario, the auxiliary terminal-control apparatus may be used as a wristband.

In another application scenario, the auxiliary terminal-control apparatus may be used as a pendant of the mobile phone.

According to a second aspect, an embodiment of this application further provides an auxiliary terminal-control method, where the method is used to control a terminal device by using an auxiliary terminal-control apparatus, and the auxiliary terminal-control apparatus includes a back plate sticker, a control key embedded into the back plate sticker, a communications module, and a control module, and the method includes:

recognizing, by the control module, a target operation on the control key, and generating, based on the target operation, a corresponding target operation instruction, where the control key includes a roll ball and/or a key, operations on the roll ball include a roll operation and a press operation, and an operation on the key includes a press operation; and sending, by the communications module, the target operation instruction to the terminal device, where the target operation instruction is used to operate an application program on the terminal device or trigger a service.

Specifically, the control module determines, based on the target operation, the target operation instruction from configuration information in a storage module, where the configuration information includes a correspondence between an operation on the control key and a generated operation instruction.

Optionally, the configuration information is sent to the communications module of the auxiliary terminal-control apparatus after being configured on the terminal device, and stored into the storage module by the communications module.

Optionally, for related information in the configuration information about what operation instruction is executed for what operation on the control key, refer to the description of the configuration information in the first aspect.

Another aspect of this application provides a computer readable storage medium, where an instruction is stored in the computer readable storage medium, and when the instruction runs on a computer, the computer is enabled to perform the method described in the foregoing second aspect.

Still another aspect of this application provides a computer program product that includes an instruction, and when the instruction runs on a computer, the computer is enabled to perform the method described in the foregoing second aspect.

The auxiliary terminal-control apparatus in the embodiments of this application may be applied to various application scenarios and may serve as a peripheral of a terminal device (for example, a mobile phone) by providing auxiliary operations or alternative operations. This helps improve convenience of use of terminal devices (for example, mobile phones).

DESCRIPTION OF EMBODIMENTS

In the embodiments of this application, an auxiliary terminal-control apparatus serves as a peripheral of a terminal device, and may be used to operate the terminal device. The following provides details.

The terminal device in the embodiments of this application includes various devices such as handheld devices, in-vehicle devices, wearable devices, computing devices, and various forms of user equipment (User Equipment, UE), for example, a mobile phone or a tablet computer. The embodiments of this application are described by using a mobile phone as an example.

Figure 1:
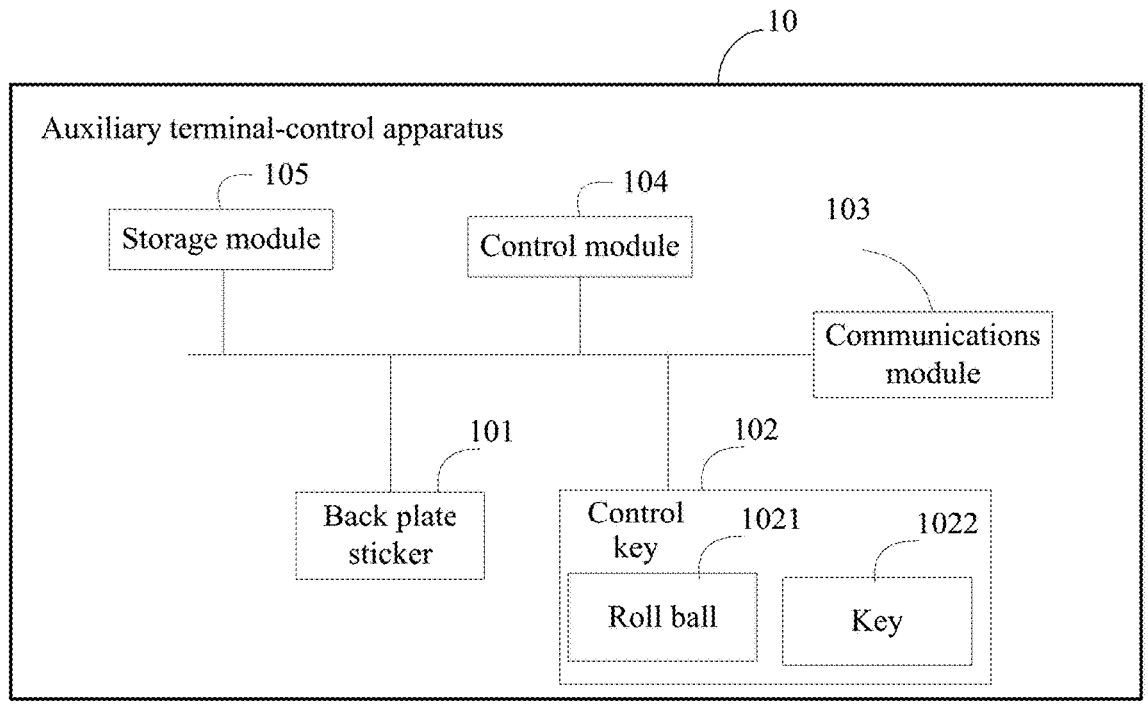
FIG. 1 is a schematic structural diagram of an auxiliary terminal-control apparatus according to an embodiment of this application.

FIG. 1 is a schematic structural diagram of an auxiliary terminal-control apparatus 10 in an embodiment of this application, including a back plate sticker 101, a control key 102 embedded into the back plate sticker 101, a communications module 103, and a control module 104. The control module 104 is configured to recognize a target operation on the control key 102, and generate a corresponding target operation instruction based on the target operation on the control key 102. The communications module 103 is configured to establish a communication connection to a terminal device to send the target operation instruction to the terminal device, and operate an application program on the terminal device or trigger a service by using the target operation instruction.

The back plate sticker 101 may be an elastic steel plate material, so as to be flexibly bent into a specific shape.

The control key 102 may include a roll ball 1021 and a key 1022, or include a roll ball 1021, or include only a key 1022. Operations on the roll ball 1021 include a roll operation and a press operation, and an operation on the key 1022 includes a press operation.

The communication connection established between the communications module 103 and the terminal device may be a wireless connection or a wired connection. The wireless connection manner includes: establishing a connection to the terminal device through Bluetooth, GPRS, or the like, and the wired connection manner includes wired communication manners, for example, through a USB, a serial port, or an earphone jack. This embodiment of this application is described by using a common Bluetooth connection as an example.

Optionally, the auxiliary terminal-control apparatus 10 further includes a storage module 105 configured to store configuration information, where the configuration information includes related information about what operation instruction is generated for each operation on the control key 102, that is, a correspondence between an operation on the control key 102 and a generated operation instruction.

It can be understood that the configuration information stored in the storage module 105 may be preconfigured at factory-delivery, or defined on the terminal device by a user. User-defined configuration information means that the user defines a specific operation instruction corresponding to an operation on each control key 102. In the case of being user-defined, it is the communications module 103 that receives the configuration information sent by the terminal device and stores the configuration information into the storage module 105.

A specific manner of generating, by the control module 104, the corresponding target operation instruction based on the target operation on the control key 102 may be: determining, based on a current target operation, a target operation instruction that should be generated in correspondence to the target operation, from the configuration information stored in the storage module 105. Then, the target operation instruction is sent to the terminal device by the communications module 103.

Specifically, if the control key 102 is a roll ball 1021, corresponding configuration information (that is, operation instructions respectively corresponding to operations on the roll ball 1021) includes but is not limited to the following several types.

If a roll operation is performed on the roll ball 1021, a corresponding operation instruction is to perform a corresponding slide operation on a touchscreen of the terminal device. Specifically, a roll direction and a roll speed on the roll ball 1021 directly determine a direction and a slide speed of the slide operation on the touchscreen of the terminal device. In this way, in this embodiment of this application, slides on the screen of the terminal device can be implemented by using the roll ball 1021 on the auxiliary terminal-control apparatus 10, so that the user can select an area of operation.

Based on the roll, if a press operation is performed on the roll ball 1021, the corresponding operation instruction is to select a slide focus (that is, a location at which a slide currently stops) of the slide operation, currently controlled by the roll ball 1021, on the terminal device. The selection herein is equivalent to an effect of tapping or pressing the screen by a user. Therefore, a user can perform any operation on the terminal device through a roll operation and a press operation on the roll ball 1021.

Optionally, if a press operation is performed on the roll ball 1021, the corresponding operation instruction may alternatively be a trigger instruction for a given function of a given target application program (a first target function of a first target application program) of the terminal device. For example, pressing down the roll ball 1021 may directly answer a current incoming phone call, or directly make a phone call to a given number in the target application program, or trigger an order-seizure function of a ride-hailing application, or trigger a photographing function of a photographing application, or implement a function, such as going to a next song, changing a playlist, or pausing playing, of a corresponding music application program. The first target function of the first target application program may be defined on the terminal device by a user. Therefore, the trigger instruction corresponding to pressing down the roll ball 1021 is not limited to those enumerated above, but may correspond to a function of any user-defined application program.

Optionally, if a press operation is performed on the roll ball 1021, the corresponding operation instruction may alternatively be a tuning operation on a volume key of the terminal device. For example, when the roll ball is rolled upward, volume is turned up, and when the roll ball is rolled downward, the volume is turned down.

If the control key 102 is a key 1022, corresponding configuration information (that is, operation instructions respectively corresponding to press operations on the key 1022) includes but is not limited to the following several types.

When the key 1022 is pressed, a corresponding operation instruction may be to select a slide focus (that is, a location at which a slide currently stops) of the slide operation, currently controlled by the roll ball 1021, on the terminal device. The selection herein is equivalent to an effect of tapping or pressing the screen by a user. Therefore, a user can perform any operation on the terminal device through a roll operation on the roll ball 1021 and a press operation on the key 1022.

When the key 1022 is pressed, the corresponding operation instruction may alternatively be a trigger instruction for a given function of a given target application program (a second target function of a second target application program) of the terminal device. For example, pressing down the key 1022 may directly answer a current incoming phone call, or directly make a phone call to a given number in the target application program, or trigger an order-seizure function of a ride-hailing application, or trigger a photographing function of a photographing application, or implement a function, such as going to a next song, changing a playlist, or pausing playing, of a corresponding music application program. The second target function of the second target application program may be defined on the terminal device by a user. Therefore, the trigger instruction corresponding to pressing down the key 1022 is not limited to those enumerated above, but may correspond to a function of any user-defined application program.

When the key 1022 is pressed, the corresponding operation instruction may alternatively be a return operation, where the return operation may be returning to a previous step or returning to a home screen of the terminal device.

Operation instructions corresponding to the foregoing operations on the roll ball 1021 and the key 1022 are not only limited to those enumerated above, but may be configured flexibly based on different application scenarios to generate different configuration information. The auxiliary terminal-control apparatus may have only a roll ball 1021, or only a key 1022, or both the roll ball 1021 and the key 1022. Different operation instructions corresponding to different user operations may be set for the roll ball 1021 and the key 1022.

The auxiliary terminal-control apparatus of this embodiment of this application is applicable to different application scenarios. For example, the auxiliary terminal-control apparatus may be stick-fitted onto a steering wheel of a vehicle, to help a user operate a mobile phone conveniently, thereby improving driving safety. For another example, the auxiliary terminal-control apparatus may be stick-fitted onto a steering wheel of a vehicle, to help a driver seize an order with one keystroke when using a ride-hailing application. For still another example, the auxiliary terminal-control apparatus may be snap-fitted onto a back case of a mobile phone, to provide an auxiliary or alternative key when a user is playing a game, thereby improving gaming experience.

The following describes the auxiliary terminal-control apparatus of this embodiment of this application in different application scenarios.

Scenario 1: Stick-fitted onto a steering wheel of a vehicle, to help a user operate a mobile phone conveniently, thereby improving driving safety.

Figure 2:
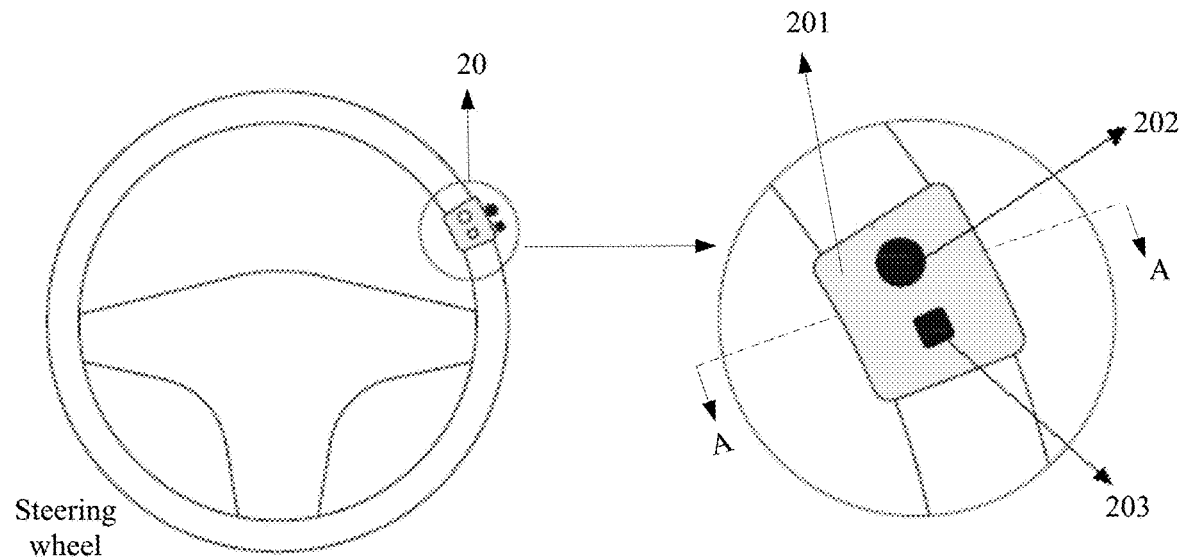
FIG. 2 is a schematic structural diagram of an auxiliary terminal-control apparatus applied to a steering wheel according to an embodiment of this application.
Figure 3:
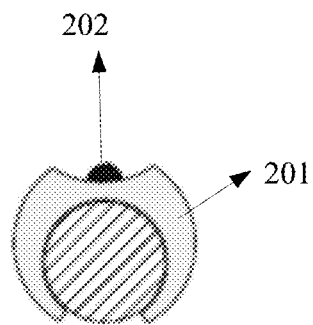
FIG. 3 is a cross sectional view of the auxiliary terminal-control apparatus in FIG. 2 according to an embodiment of this application.

As shown in FIG. 2, an auxiliary terminal-control apparatus 20 is circle-fitted onto a steering wheel and includes a back plate sticker 201, and a roll ball 202 and a key 203 that are embedded into the back plate sticker 201. The back plate sticker 201 may include an elastic steel plate material, for ease of installation, removal, and carrying. FIG. 3 is an A-A cross sectional view of the auxiliary terminal-control apparatus 20. As shown in FIG. 3, the roll ball 202 is embedded into a groove of the back plate sticker 201. This makes it convenient for a user to roll and can also avoid touch operations on the roll ball 202 by mistake when the user turns the steering wheel. The key 203 may protrude from the back plate sticker 201 in a normal way, to help pressing of the user.

In this embodiment of this application, the roll ball 202 may be rolled and pressed. Rolling the roll ball 202 is to select a target area on a touchscreen of the terminal device, and pressing the roll ball 202 is to select the target area at which a slide stops. The key 203 may be configured to implement returning. Therefore, the user may control a slide on the touchscreen of the mobile phone by rolling the roll ball 202, and when sliding to a target area, the user may select the current target area by pressing down the roll ball 202. When a return is required, the user may press down the key 203 to return.

In the auxiliary terminal-control apparatus 20 applied to a steering wheel in this embodiment of this application, the roll ball 202 is configured for selection and confirmation, and the protruding key 203 is configured to implement returning. The auxiliary terminal-control apparatus 20 may be causally stick-fitted onto the steering wheel, to help a driver operate and control the mobile phone conveniently under safe driving.

Scenario 2: Snap-fitted onto a steering wheel of a vehicle, to help one-keystroke order seizure.

Figure 4:
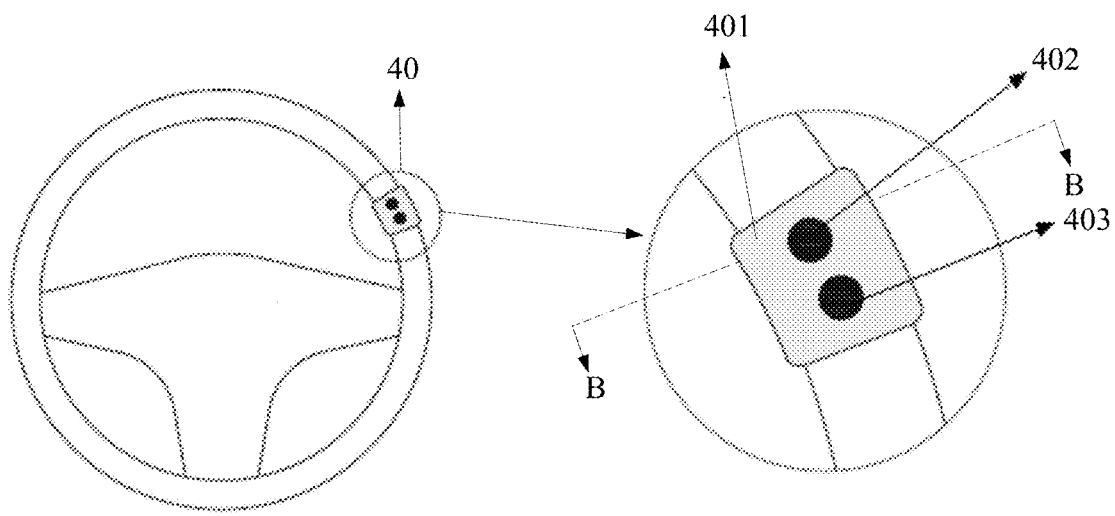
FIG. 4 is another schematic structural diagram of an auxiliary terminal-control apparatus applied to a steering wheel according to an embodiment of this application.
Figure 5:
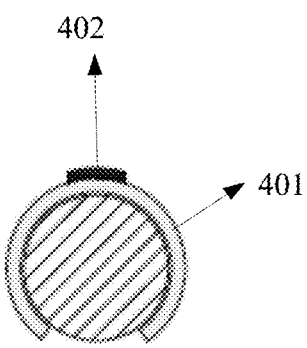
FIG. 5 is a cross sectional view of the auxiliary terminal-control apparatus in FIG. 4 according to an embodiment of this application.

As shown in FIG. 4, an auxiliary terminal-control apparatus 40 is circle-fitted onto a steering wheel and includes a back plate sticker 401 and two protruding keys embedded into the back plate sticker 401: a key 402 and a key 403. An elastic steel plate material may be used for the back plate sticker 401, for ease of installation, dismantling, and carrying. FIG. 5 is a B-B cross sectional view of the auxiliary terminal-control apparatus 40. As shown in FIG. 5, the key 402 or the key 403 protrudes from the back plate sticker 401 in a normal way, to help pressing of a user.

In this embodiment of this application, a function corresponding to each key 402, 403 may be flexibly set. Pressing down the key 402 may be set to implement one-keystroke order seizure in a ride-hailing application program, and pressing down the key 403 may be set to make a phone call to a passenger or answer an incoming phone call.

When a driver uses a ride-hailing application program for an order seizure, the auxiliary terminal-control apparatus 40 in this embodiment of this application may be used to seize an order rapidly, make a phone call to a specific number, answer an incoming phone call, or the like. As such, the driver does not need to check a mobile phone screen instantly, and when hearing a suitable ride-hailing service order, the driver no longer needs to tap the screen for order seizure with one hand off the steering wheel. Instead, the driver only needs to press down a key quickly on the auxiliary terminal-control apparatus 40 to seize the order. This not only improves driving safety assurance, but also increases a success rate of order seizure.

Scenario 3: Snap-fitted onto a case of a mobile phone, to assist in operating the mobile phone.

Figure 6:
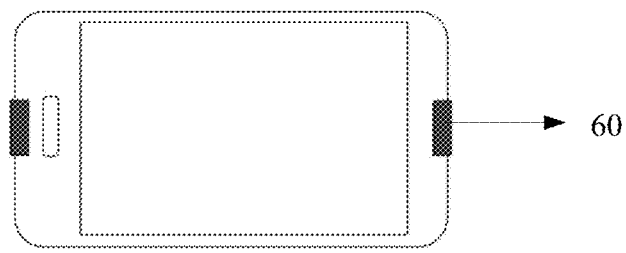
FIG. 6 is a main view of a structure of an auxiliary terminal-control apparatus applied to a case of a mobile phone according to an embodiment of this application.
Figure 7:
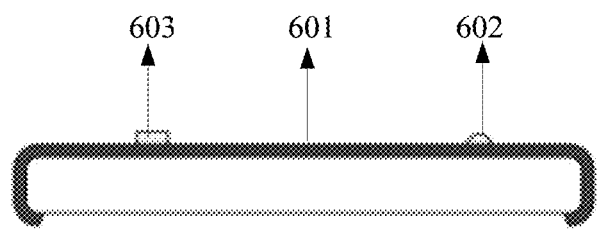
FIG. 7 is a top view of the auxiliary terminal-control apparatus in FIG. 6 according to an embodiment of this application.
Figure 8:
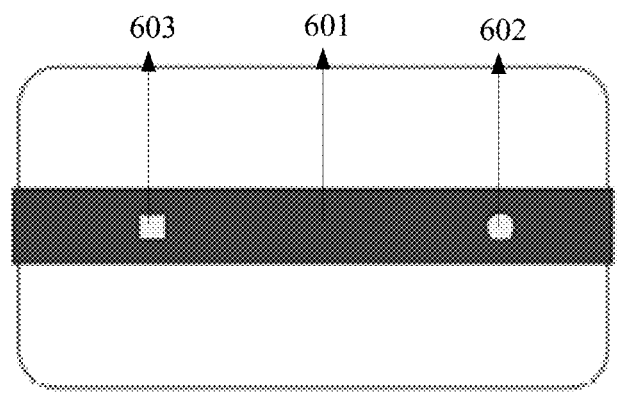
FIG. 8 is a rear view of the auxiliary terminal-control apparatus in FIG. 6 according to an embodiment of this application.

FIG. 6 is a main view of an auxiliary terminal-control apparatus 60 snap-fitted onto a back case of a mobile phone, FIG. 7 is a top view of the auxiliary terminal-control apparatus 60 snap-fitted onto a back case of a mobile phone, and FIG. 8 is a rear view of the auxiliary terminal-control apparatus 60 snap-fitted onto a back case of a mobile phone. The auxiliary terminal-control apparatus 60 includes a back plate sticker 601, and a roll ball 602 and a key 603 that are embedded into the back plate sticker 601.

In this embodiment of this application, the roll ball 602 may be rolled and pressed. The roll ball 602 and the key 603 may be used as an auxiliary operation apparatus or an alternative operation apparatus for a mobile phone application program (for example, a game application program). For example, in game application programs such as racing games (for example, Riptide GP) that require control over directions, rolling the roll ball 602 may control a moving direction and a moving speed of an object (for example, "yacht"), and pressing down the key 603 may execute a specific function, for example, pause a current game.

Control operation instructions corresponding to the roll ball 602 and the key 603 are not limited to the foregoing operation instructions, but alternatively, may be other user-defined operation instructions. For example, rolling the roll ball 602 controls a moving direction of an object, and pressing the key 603 controls a speed of the object. For another example, when a user is watching a video or playing a game, pressing down the key 603 may answer a current incoming phone call, so that a current user operation is not interrupted.

With the auxiliary terminal-control apparatus 60 in this embodiment, two thumbs of a user do not have to operate a touchscreen of the mobile phone, so that screen display of the mobile phone is not blocked, and a gaming experience is improved. In addition, the two control keys 602, 603 may be used as auxiliary keys for some games to enrich operation functions.

Scenario 4: Used as a wristband.

Figure 9:
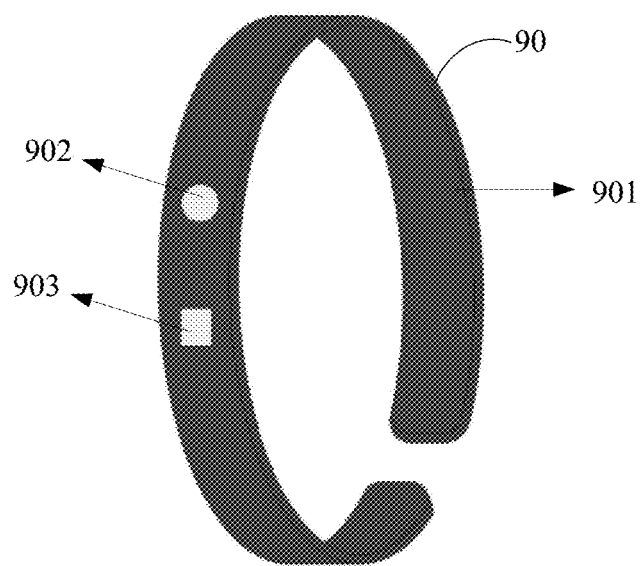
FIG. 9 is a schematic structural diagram of an auxiliary terminal-control apparatus used as a wristband according to an embodiment of this application.

As shown in FIG. 9, the auxiliary terminal-control apparatus 90 may be used as a wristband, and includes a back plate sticker 901, a roll ball 902 and a key 903 that are embedded into the back plate sticker 901. An elastic steel plate material may be used for the back plate sticker 901, for ease of wearing and adjusting a size of the wristband.

In this embodiment of this application, the roll ball 902 may be rolled and pressed, and the key 903 may be pressed. Operation instructions corresponding to operations on the roll ball 902 and the key 903 may be preset. For example, when there is an incoming phone call, the key 903 may be pressed down to answer the call. For another example, when an alarm of a mobile phone rings, the key 903 of the wristband may be directly pressed down to turn off the alarm, or delay ringing of the alarm for a preset time. For still another example, during listening to music on a mobile phone, the control keys of the wristband may be used for tuning of a volume, pausing, playing, going back to a previous song or going forward to a next song. For example, the roll ball 902 is rolled upward to turn up the volume and rolled downward to turn down the volume; the roll ball 902 is rolled leftward to switch back to the previous song and rolled rightward to switch to the next song; and the key 903 is pressed down to pause or start playing.

The auxiliary terminal-control apparatus 90 in this embodiment may be used as a wristband, with which simple operations can be performed on a mobile phone when the mobile phone is not reachable by a user. This satisfies requirements for convenience of operating mobile phones in some particular scenarios.

Scenario 5: Used as a pendant of a mobile phone.

Figure 10:
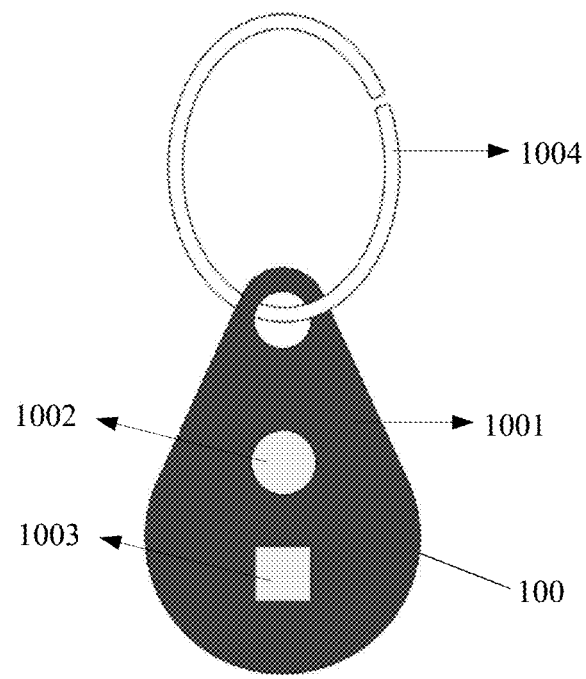
FIG. 10 is another schematic structural diagram of an auxiliary terminal-control apparatus according to an embodiment of this application.

The auxiliary terminal-control apparatus 100 may alternatively be presented with a structure shown in FIG. 10. The auxiliary terminal-control apparatus 100 shown in FIG. 10 includes a pendant 1001, and a roll ball 1002 and a key 1003 that are embedded into the pendant 1001. The pendant 1001 is connected to a buckle ring 1004. The buckle ring facilitates ease of carrying, for example, carried as a key ring.

For operation instructions corresponding to operations on and application scenarios of the roll ball 1002 and the key 1003 shown in FIG. 10, refer to the embodiment corresponding to the wristband shown in FIG. 9. They may be the same as the operation instructions corresponding to operations on and the application scenarios of the roll ball 902 and the key 903. Details are not further described in this embodiment of this application.

It should be noted that application scenarios of the auxiliary terminal-control apparatus 100 in this embodiment of this application are not limited. The auxiliary terminal-control apparatus 100 may be applied to not only the foregoing application scenarios but also other scenarios in which a peripheral is used to operate a terminal device, for example, a mobile phone.

In addition to the several modules shown in FIG. 1, the auxiliary terminal-control apparatus in the embodiments of this application may further include a power supply module. The power supply module may be a battery (for example, a button battery) or a chargeable power supply module.

Figure 11:
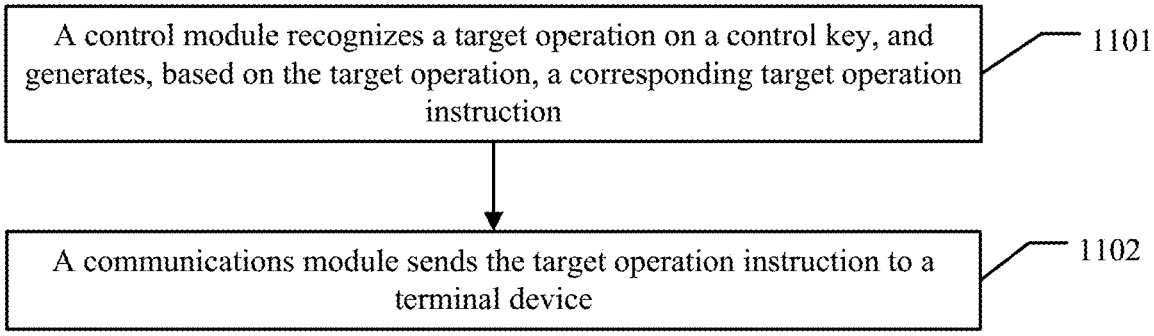
FIG. 11 is a flowchart of an auxiliary terminal-control method according to an embodiment of this application.

The foregoing describes the auxiliary terminal-control apparatus in the embodiments of this application. In addition, an embodiment of this application further provides an auxiliary terminal-control method. The method is applied to an auxiliary terminal-control apparatus, where a structure of the apparatus is shown in FIG. 1. As shown in FIG. 11, the method includes the following steps.

1101. A control module recognizes a target operation on a control key, and generates, based on the target operation, a corresponding target operation instruction.

The control key includes a roll ball and/or a key. Operations on the roll ball include a roll operation and a press operation, and an operation on the key includes a press operation.

A manner of generating, based on the target operation, the corresponding target operation instruction is specifically: determining, based on the target operation, the target operation instruction corresponding to the target operation from configuration information stored in the auxiliary terminal-control apparatus. The configuration information includes a correspondence between an operation on the control key and a generated operation instruction, that is, related information about what operation instruction is generated for each user operation on the control key.

Specifically, the configuration information may be sent by a terminal device to the auxiliary terminal-control apparatus after being defined on the terminal device by a user. After receiving the configuration information from the terminal device, the auxiliary terminal-control apparatus stores the configuration information into a storage module. Alternatively, the configuration information may be preconfigured at factory-delivery.

1102. A communications module sends the target operation instruction to a terminal device.

The target operation instruction is used to operate an application program on the terminal device or trigger a service.

For what operation instruction is generated based on what operation on the control key, and what application program or service is triggered on the terminal device, refer to the descriptions in the foregoing apparatus embodiments (FIG. 1 to FIG. 10), and details are not described herein again.

It should be noted that all or some of the foregoing embodiments may be implemented by using software, hardware, firmware, or any combination thereof. When software is used to implement the embodiments, the embodiments may be implemented completely or partially in a form of a computer program product.

The computer program product includes one or more computer instructions. When the computer program instructions are loaded and executed on a computer, the procedure or functions according to the embodiments of this application are all or partially generated. The computer may be a general-purpose computer, a dedicated computer, a computer network, or other programmable apparatuses. The computer instructions may be stored in a computer readable storage medium. The computer readable storage medium may be any usable medium accessible by a computer, or a data storage device, such as a server or a data center, containing one or more usable media. The usable medium may be a magnetic medium (for example, a floppy disk, a hard disk, or a magnetic tape), an optical medium (for example, a DVD), a semiconductor medium (for example, a solid state disk (Solid State Disk, SSD)), or the like.

It can be clearly understood by a person skilled in the art that, for the purpose of convenient and brief description, for a detailed working process of the foregoing system, apparatus, or unit, reference may be made to a corresponding process in the foregoing method embodiments, and details are not described herein again.

In the specification, claims, and accompanying drawings of this application, the terms "first," "second," "third," "fourth," and so on (if existent) are intended to distinguish between similar objects without necessarily indicating a specific order or sequence. It should be understood that, the data termed in such a way are interchangeable in appropriate circumstances so that the embodiments described herein can be implemented in orders other than the order illustrated or described herein. Moreover, the terms "include", "contain" and any other variants thereof mean to cover the non-exclusive inclusion, for example, a process, method, system, product, or device that includes a list of steps or units is not necessarily limited to those steps or units, but may include other steps or units not expressly listed or inherent to such a process, method, system, product, or device.

In the several embodiments provided in this application, it should be understood that, the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be indirect couplings or communication connections through some interfaces, apparatuses, or units, and may be in electronic, mechanical, or other forms.

The units described as separate parts may or may not be physically separate. Parts displayed as units may or may not be physical units, and may be located in one place or distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware or implemented in a form of a software functional unit.

When the integrated unit is implemented in the form of a software functional unit and sold or used as an independent product, the integrated unit may be stored in a computer readable storage medium. Based on such an understanding, all or some of the technical solutions of this application may be implemented in a form of a software product. The software product is stored in a storage medium, and includes several instructions for instructing a computer device (which may be a personal computer, a server, or a network device) to perform all or some of the steps of the methods described in the embodiments. The foregoing storage medium includes any medium that can store program code, such as a USB flash drive, a removable hard disk, a read-only memory (Read-Only Memory, ROM), a random access memory (Random Access Memory, RAM), a magnetic disk, or an optical disc.

In this specification, specific examples are used to describe the principle and implementations of this application. The description of the embodiments is only intended to help understand the method and core idea of this application, and a person of ordinary skill in the art may make modifications based on the idea of this application with respect to the specific implementations and the application scope. Therefore, the content of this specification shall not be construed as limitations on the embodiments of this application.

The invention claimed is:

1. An auxiliary terminal-control apparatus, comprising:
a back plate sticker;
a control key embedded into the back plate sticker;
a communications module;
a processor; and
a memory, configured to store configuration information, wherein the configuration information comprises a correspondence between an operation on the control key and a generated operation instruction;
wherein
the processor is configured to recognize a target operation on the control key, and generate, based on the target operation, a corresponding target operation instruction, wherein the control key comprises a roll ball, operations on the roll ball comprise a roll operation and a press operation;
the processor is configured to determine, based on the target operation, the target operation instruction from the configuration information;
the communications module is configured to establish a Bluetooth, Wi-Fi, GPRS, a USB, a serial port or an earphone jack communication connection to a terminal device to send the target operation instruction to the terminal device, wherein the target operation instruction is used to operate an application program or trigger a service on the terminal device;
the configuration information comprises:
generating a slide operation instruction for a touchscreen of the terminal device based on the roll operation on the roll ball, and
generating a selection operation instruction based on the press operation on the roll ball, so as to select a location at which the slide operation currently stops; and
the back plate sticker has a curved surface, and has a recess on an outer surface in which the roll ball sits.

2. The auxiliary terminal-control apparatus according to claim 1, wherein
the communications module is further configured to receive the configuration information sent by the terminal device, and store the configuration information into the storage module.

3. The auxiliary terminal-control apparatus according to claim 1, wherein the configuration information further comprises one or more of the following:
generating a trigger instruction for a first target function of a first target application program on the terminal device based on the press operation on the roll ball, wherein the first target function of the first target application program comprises answering a phone call, making a phone call, an order-seizure function of a ride-hailing application, or photographing; and
generating a tuning operation instruction for a volume key of the terminal device based on the roll operation on the roll ball.

4. The auxiliary terminal-control apparatus according to claim 1, wherein the control key further comprises a key and an operation on the key comprises a press operation, the configuration information further comprises:
generating a press-down operation instruction based on the press operation on the key, wherein the press-down operation instruction is used to perform a press-down operation on a location at which the slide operation currently stops.

5. The auxiliary terminal-control apparatus according to claim 1, wherein the control key further comprises a key and an operation on the key comprises a press operation, the configuration information comprises one or more of the following:
generating a trigger instruction for a second target function of a second target application program on the terminal device based on the press operation on the key, wherein the second target function of the second target application program comprises answering a phone call, making a phone call, an order-seizure function of a ride-hailing application, or photographing; and
generating a return operation instruction based on the press operation on the key.

6. The auxiliary terminal-control apparatus according to claim 1, wherein
the terminal device is a mobile phone, and the auxiliary terminal-control apparatus is stick-fitted onto a steering wheel of a vehicle.

7. The auxiliary terminal-control apparatus according to claim 1, wherein
the terminal device is a mobile phone, and the auxiliary terminal-control apparatus is snap-fitted onto a case of a mobile phone.

8. The auxiliary terminal-control apparatus according to claim 1, wherein the back plate sticker is elastic, has a curved surface, and has an opening to elastically be capable of receiving an external element, and a recess on an outer surface in which the roll ball sits.

9. The auxiliary terminal-control apparatus according to claim 1, wherein the back plate sticker is elastic, and has an opening to elastically be capable of receiving an external element, wherein the track ball does not extend as far from the recess as the curved surface would have extended absent the recess.

10. The auxiliary terminal-control apparatus according to claim 1, wherein the control key does not have a display component.

11. The auxiliary terminal-control apparatus according to claim 1, wherein the back plate sticker has another curved surface on a side of the auxiliary terminal-control apparatus opposite to that of the curved surface, and the another curved surface has an opening to elastically be capable of receiving an external element, and the roll ball is a physical elements.

12. The auxiliary terminal-control apparatus according to claim 1, wherein the back plate sticker has a flat surface and curved elastic edges, wherein the roll ball is positioned on the flat surface, and the curved elastic edges have an opening therebetween to elastically be capable of receiving an external element, and the roll ball is a physical elements.

13. The auxiliary terminal-control apparatus according to claim 1, wherein the back plate sticker is a pendant.

14. The auxiliary terminal-control apparatus according to claim 1, wherein the back plate sticker is elastic so as to be snap-fittable around an external element.

15. An auxiliary terminal-control method, wherein the method is used to control a terminal device by using an auxiliary terminal-control apparatus, the auxiliary terminal-control apparatus comprises a back plate sticker, a control key embedded into the back plate sticker, a communications module, and a control module, and the method comprises:
recognizing, by the control module, a target operation on the control key,
and generating, based on the target operation, a corresponding target operation instruction, wherein the control key comprises a roll ball, operations on the roll ball comprise a roll operation and a press operation; and
sending, by the communications module establishing a Bluetooth, Wi-Fi, GPRS, a USB, a serial port or an earphone jack communication connection, the target operation instruction to the terminal device, wherein the target operation instruction is used to operate an application program on the terminal device or trigger a service;

wherein the generating, by the control module, based on the target operation, a corresponding target operation instruction comprises:
determining, by the control module based on the target operation, the target operation instruction from configuration information, wherein the configuration information comprises a correspondence between an operation on the control key and a generated operation instruction
wherein the configuration information comprises:
generating a slide operation instruction for a touchscreen of the terminal device based on the roll operation on the roll ball, and
generating a selection operation instruction based on the press operation on the roll ball, so as to select a location at which the slide operation currently stops; and
wherein the back plate sticker has a curved surface, and has a recess on an outer surface in which the roll ball sits.

16. The method according to claim 15, wherein the generating, by the control module, based on the target operation, a corresponding target operation instruction comprises:
determining, by the control module based on the target operation, the target operation instruction from configuration information, wherein the configuration information comprises a correspondence between an operation on the control key and a generated operation instruction.

17. The auxiliary terminal-control method according to claim 15, wherein the back plate sticker is elastic so as to be snap-fittable around an external element.

18. A non-transitory computer readable storage medium, comprising an instruction, wherein when the instruction runs on a computer, the computer is enabled to perform the steps:
recognizing a target operation on a control key, and generating, based on the target operation, a corresponding target operation instruction, wherein the control key comprises a roll ball, operations on the roll ball comprise a roll operation and a press operation; and
sending by establishing a Bluetooth, Wi-Fi, GPRS, a USB, a serial port or an earphone jack communication connection, the target operation instruction to the terminal device, wherein the target operation instruction is used to operate an application program on the terminal device or trigger a service;
determining, based on the target operation, the target operation instruction from configuration information, wherein the configuration information comprises a correspondence between an operation on the control key and a generated operation instruction
wherein the configuration information comprises:
generating a slide operation instruction for a touchscreen of the terminal device based on the roll operation on the roll ball; and
generating a selection operation instruction based on the press operation on the roll ball, so as to select a location at which the slide operation currently stops; and
wherein the roll ball sits in a recess on an outer surface of a back plate sticker which has a curved surface.

19. The non-transitory computer readable storage medium according to claim 18, wherein the back plate sticker is elastic so as to be snap-fittable around an external element.

* * * * *